US 9,967,606 B2

United States Patent
Hundemer

(10) Patent No.: US 9,967,606 B2
(45) Date of Patent: *May 8, 2018

(54) SYSTEM AND METHOD FOR SCHEDULING CLIPS

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/472,161

(22) Filed: Mar. 28, 2017

(65) Prior Publication Data

US 2017/0201785 A1   Jul. 13, 2017

Related U.S. Application Data

(63) Continuation of application No. 14/209,029, filed on Mar. 13, 2014, now Pat. No. 9,648,370.

(51) Int. Cl.
*H04N 9/80* (2006.01)
*H04N 21/262* (2011.01)
(Continued)

(52) U.S. Cl.
CPC . *H04N 21/26258* (2013.01); *H04N 21/26283* (2013.01); *H04N 21/42684* (2013.01);
(Continued)

(58) Field of Classification Search
CPC ......... H04N 21/26258; H04N 21/8126; H04N 21/84; H04N 21/8456; H04N 21/42684; H04N 21/26283; H04N 21/6543
(Continued)

(56) References Cited

U.S. PATENT DOCUMENTS 6,049,332 A * 4/2000 Boetje .................. G11B 27/105
345/6
2003/0001880 A1   1/2003 Holtz
(Continued)

OTHER PUBLICATIONS

Office Action dated Oct. 22, 2015 issued in U.S. Appl. No. 14/208,933.
(Continued)

*Primary Examiner* — William Tran
(74) *Attorney, Agent, or Firm* — McDonnell Boehnen Hulbert & Berghoff LLP

(57) ABSTRACT

Disclosed is a system and method for scheduling clips. An example method involves (i) accessing a first list that includes ordered clip identifiers $C_1 \ldots C_n$; (ii) accessing a second list that includes a player identifier $P_q$; (iii) accessing a third list that includes player identifiers $P_1 \ldots P_x$; (iv) making a determination that a particular clip identifier from the clip identifiers $C_1 \ldots C_n$ is associated with a property; (v) responsive to making the determination, assigning to the particular clip identifier, the player identifier $P_q$; (vi) assigning to each clip identifier $C_1 \ldots C_n$ except for the particular clip identifier, a respective one of the player identifiers $P_1 \ldots P_x$, wherein the player identifiers are selected in an ordered and looping fashion; and (vii) for each of the clip identifiers $C_1 \ldots C_n$, causing a player identified by the one of the player identifiers $P_q$ or $P_1 \ldots P_x$ assigned to that clip identifier to load a clip identified by that clip identifier.

20 Claims, 6 Drawing Sheets

(51) Int. Cl.
  *H04N 21/81* (2011.01)
  *H04N 21/84* (2011.01)
  *H04N 21/845* (2011.01)
  *H04N 21/426* (2011.01)
  *H04N 21/6543* (2011.01)

(52) U.S. Cl.
  CPC ..... *H04N 21/6543* (2013.01); *H04N 21/8126* (2013.01); *H04N 21/84* (2013.01); *H04N 21/8456* (2013.01)

(58) Field of Classification Search
  USPC .......................................................... 386/248
  See application file for complete search history.

(56) References Cited

U.S. PATENT DOCUMENTS

| | | | |
|---|---|---|---|
| 2003/0156824 A1* | 8/2003 | Lu | G11B 27/105 386/230 |
| 2008/0034093 A1 | 2/2008 | Sutou | |
| 2008/0244605 A1* | 10/2008 | Bennington | G06Q 10/06 705/7.14 |
| 2014/0109154 A1 | 4/2014 | Basse et al. | |
| 2014/0258450 A1* | 9/2014 | Suryanarayanan | H04L 67/1097 709/217 |
| 2015/0160977 A1 | 6/2015 | Accapadia et al. | |
| 2015/0294025 A1 | 10/2015 | Wellen et al. | |

OTHER PUBLICATIONS

Office Action dated Oct. 21, 2015 issued in U.S. Appl. No. 14/209,190.
Hundemer, Hank J., U.S. Appl. No. 14/208,933, filed Mar. 13, 2014.
Hundemer, Hank J., U.S. Appl. No. 14/209,190, filed Mar. 13, 2014.
Final Office Action dated May 4, 2016 issued in U.S. Appl. No. 14/208,933.
Final Office Action dated May 2, 2016 issued in U.S. Appl. No. 14/209,190.
Hundemer, Hank J., U.S. Appl. No. 14/208,898, filed Mar. 13, 2014.
Office Action dated Oct. 21, 2015 issued in U.S. Appl. No. 14/208,898.
Final Office Action dated Jun. 6, 2016 issued in U.S. Appl. No. 14/208,898.

* cited by examiner

FIG. 3A

| Title | Clip Identifier | Player Identifier | Reserved Player Request |
|---|---|---|---|
| Clip 1 | $C_1$ | | |
| Clip 2 | $C_2$ | | |
| Clip 3 | $C_3$ | | |
| Clip 4 | $C_4$ | | |
| Clip 5 | $C_5$ | | |
| Clip 6 | $C_6$ | | X |
| Clip 7 | $C_7$ | | |

FIG. 3B

| Title | Clip Identifier | Player Identifier | Reserved Player Request |
|---|---|---|---|
| Clip 1 | $C_1$ | | |
| Clip 2 | $C_2$ | | |
| Clip 3 | $C_3$ | | |
| Clip 4 | $C_4$ | | |
| Clip 5 | $C_5$ | | |
| Clip 6 | $C_6$ | $P_4$ | X |
| Clip 7 | $C_7$ | | |

| Title | Clip Identifier | Player Identifier | Reserved Player Request |
|---|---|---|---|
| Clip 1 | $C_1$ | $P_1$ | |
| Clip 2 | $C_2$ | $P_2$ | |
| Clip 3 | $C_3$ | $P_3$ | |
| Clip 4 | $C_4$ | $P_1$ | |
| Clip 5 | $C_5$ | $P_2$ | |
| Clip 6 | $C_6$ | $P_4$ | x |
| Clip 7 | $C_7$ | $P_3$ | |

| Title | Clip Identifier | Player Identifier | Reserved Player Request |
|---|---|---|---|
| Clip 1 | $C_1$ | $P_1$ | |
| Clip 2 | $C_2$ | $P_2$ | |
| Clip 3 | $C_3$ | $P_3$ | |
| Clip 6 | $C_6$ | $P_4$ | x |
| Clip 4 | $C_4$ | $P_1$ | |
| Clip 5 | $C_5$ | $P_2$ | |
| Clip 7 | $C_7$ | $P_3$ | |

SYSTEM AND METHOD FOR SCHEDULING CLIPS

RELATED DISCLOSURE

This disclosure is a continuation of U.S. patent application Ser. No. 14/209,029 filed on Mar. 13, 2014, which is hereby incorporated by reference herein in its entirety

USAGE AND TERMINOLOGY

Throughout this application, with respect to all reasonable derivatives of such terms, and unless otherwise specified (and/or unless the particular context clearly dictates otherwise), each usage of:

"a" or "an" means at least one.
"the" means the at least one.
"video" means any material represented in a video format (i.e., having multiple frames). In some instances, video may include multiple sequential frames that are identical or nearly identical, and that may give the impression of a still image. Video may or may not include an audio portion.
"clip" means a portion of video.
"player" means a video player.

TECHNICAL FIELD

The disclosed system and method relate generally to scheduling clips, such as in connection with a news production system.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast. In this context, the news program may be produced in accordance with a "rundown." Generally, a rundown is a schedule of events (and related information) that make up a news program. For instance, a rundown may indicate that various clips are to be loaded and played out by a player in a particular order so that the clips may be part of the news program.

For a variety of reasons, it may take several seconds for a player to load a clip. Also, a player may be configured such that it may either load or playout a clip (but not both together) at any given time. Therefore, there may be a delay between the time that a particular player finishes playing out a first clip and the time that the player may begin playing out a second clip (i.e., to allow the player sufficient time to load the second clip). Such a delay may be problematic, such as where a rundown indicates that the second clip should be played out immediately after the first clip (i.e., without any intervening delay).

SUMMARY

In one aspect, an example method involves (i) accessing a first list that includes ordered clip identifiers $C_1 \ldots C_n$; (ii) accessing a second list that includes a player identifier $P_q$; (iii) accessing a third list that includes player identifiers $P_1 \ldots P_x$; (iv) making a determination that a particular clip identifier from the clip identifiers $C_1 \ldots C_n$ is associated with a particular property; (v) responsive to making the determination, assigning to the particular clip identifier, the player identifier $P_q$; (vi) assigning to each clip identifier $C_1 \ldots C_n$ except for the particular clip identifier, a respective one of the player identifiers $P_1 \ldots P_x$, wherein the respective ones of the player identifiers are selected in an ordered and looping fashion; and (vii) for each of the clip identifiers $C_1 \ldots C_n$, causing a player identified by the one of the player identifiers $P_q$ or $P_1 \ldots P_x$ assigned to that clip identifier to load a clip identified by that clip identifier.

In another aspect, an example system includes a first set of players; a second set of players; and a non-transitory computer-readable medium including a set of program instructions, that when executed, cause performance of a set of functions comprising (i) accessing a first list that includes ordered clip identifiers $C_1 \ldots C_n$; (ii) accessing a second list that includes player identifier $P_q$, wherein the player identifier $P_q$ corresponds with one of the players in the first set of players; (iii) accessing a third list that includes player identifiers $P_1 \ldots P_x$, wherein each player identifier $P_1 \ldots P_x$ corresponds with a respective one of the players in the second set of players; (iv) making a determination that a particular clip identifier from the clip identifiers $C_1 \ldots C_n$ is associated with a particular property; (v) responsive to making the determination, assigning to the particular clip identifier the player identifier $P_q$; (vi) assigning to each clip identifier $C_1 \ldots C_n$ except for the particular clip identifier, a respective one of the player identifiers $P_1 \ldots P_x$, wherein the respective ones of the player identifiers are selected in an ordered and looping fashion; and (vii) for each of the clip identifiers $C_1 \ldots C_n$, causing the one of the players identified by the one of the player identifiers $P_q$ or $P_1 \ldots P_x$ assigned to that clip identifier to load a clip identified by that clip identifier.

In another aspect, an example method involves: (i) accessing a first list that includes ordered clip identifiers $C_1 \ldots C_n$; (ii) accessing a second list that includes player identifiers $P_1 \ldots P_x$; (iii) making a determination that a particular clip identifier from the clip identifiers $C_1 \ldots C_n$ is associated with a particular property; (iv) responsive to making the determination, assigning to the particular clip identifier, a particular one of the player identifiers $P_1 \ldots P_x$; (v) assigning to each clip identifier $C_1 \ldots C_n$ except for the particular clip identifier, a respective one of the player identifiers $P_1 \ldots P_x$ except for the particular player identifier, wherein the respective ones of the player identifiers are selected in an ordered and looping fashion; and (vi) for each of the clip identifiers $C_1 \ldots C_n$, causing a player identified by the one of the player identifiers $P_1 \ldots P_x$ assigned to that clip identifier to load a clip identified by that clip identifier.

In another aspect, an example system includes multiple players and a non-transitory computer-readable medium including a set of program instructions, that when executed, cause performance of a set of functions comprising (i) accessing a first list that includes ordered clip identifiers $C_1 \ldots C_n$; (ii) accessing a second list that includes player identifiers $P_1 \ldots P_x$, wherein each player identifier $P_1 \ldots P_x$ corresponds with a respective one of the players; (iii) making a determination that a particular clip identifier from the clip identifiers $C_1 \ldots C_n$ is associated with a particular property; (iv) responsive to making the determination, assigning to the particular clip identifier, a particular one of the player identifiers $P_1 \ldots P_x$; (v) assigning to each clip identifier $C_1 \ldots C_n$ except for the particular clip identifier, a respective one of the player identifiers $P_1 \ldots P_x$ except for the particular player identifier, wherein the respective ones of the player identifiers are selected in an ordered and looping fashion; and (vi) for each of the clip identifiers $C_1 \ldots C_n$, causing the one of the players identified by the one of the player identifiers $P_1 \ldots P_x$ assigned to that clip identifier to load a clip identified by that clip identifier.

These, as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3A is a diagram of an example rundown in a first state.

FIG. 3B is a diagram of the example rundown of FIG. 3A, in a second state.

DETAILED DESCRIPTION OF THE DRAWINGS

I. Overview

Figure 1:
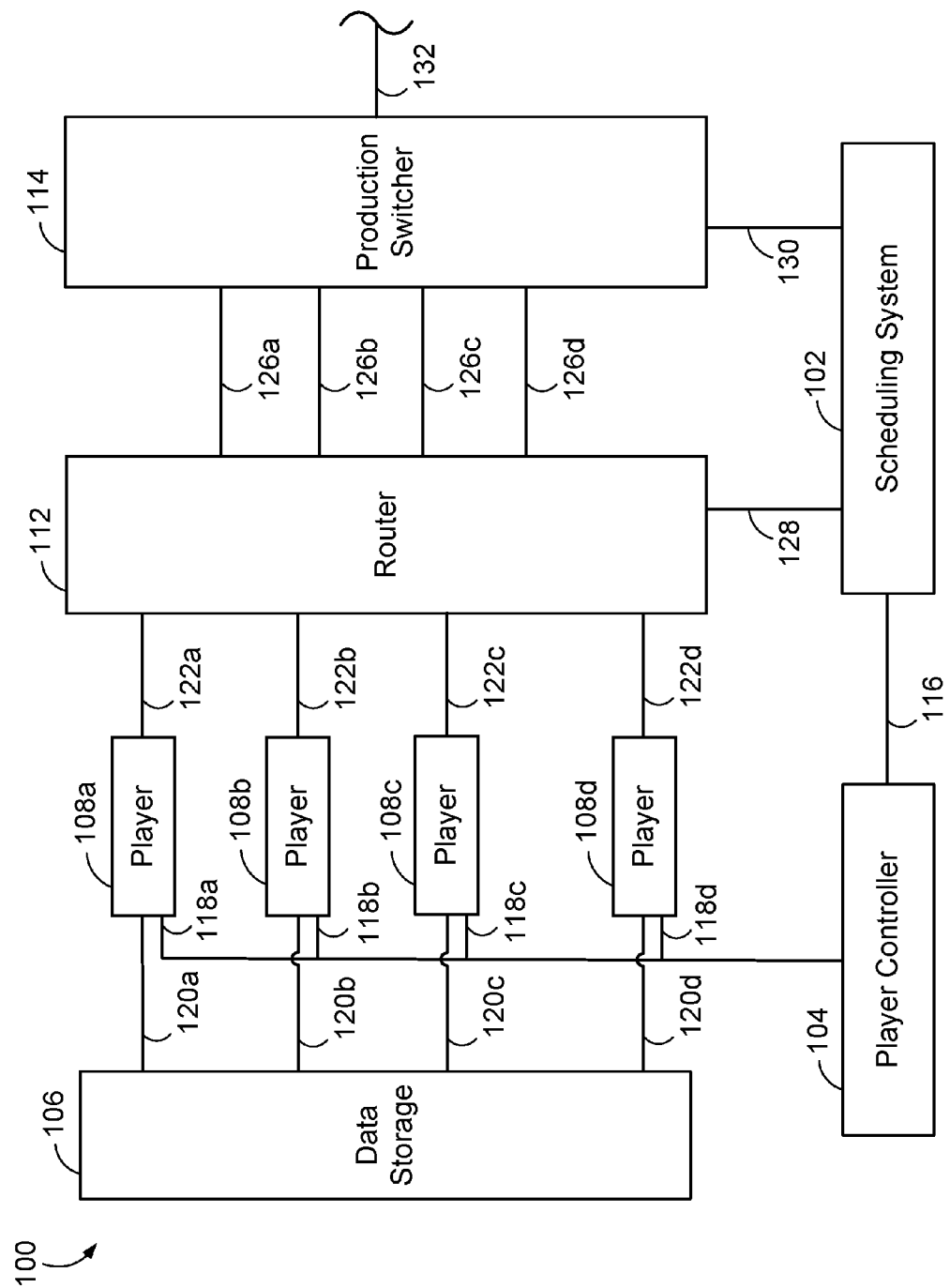
FIG. 1 is a simplified diagram of an example NPS.

As discussed above, in the context of an NPS, there may be a delay between the time that a particular player finishes playing out a first clip and the time that the player may begin playing out a second clip. To help address this issue, an NPS may use multiple players to load and playout clips indicated in a rundown.

With this configuration, a user may assign to each clip, a respective player in such a manner so as to reduce or avoid the delay issue discussed above. Note that in a rundown, players may be identified by player identifiers and clips may be identified by clip identifiers. As such, the process of a user assigning a player to a clip may involve the user editing the rundown to indicate that a particular player identifier is assigned to a particular clip identifier.

To illustrate how a user may assign example player identifiers to clip identifiers in a manner that reduces or avoids the delay issue discussed above, consider an NPS that includes two players, and therefore two player identifiers. In this instance, a user may assign to clip identifiers in a rundown, one of the two player identifiers, with the player identifiers being selected in an alternating fashion. Therefore, while a first player is playing out a first clip, a second player may load a second clip. And when the first player finishes playing out the first clip, the second player may immediately start playing out the second clip. This process may be repeated such that each pair of ordered clips may be played out in order and without any intervening delay.

In some cases, such as where the first clip has a short duration, it may take longer for the second player to load the second clip than it takes for the first player to playout the first clip. Therefore, in some instances an NPS may need to use three or more players to reduce or avoid the delay issue discussed above. In such instances, player identifiers may be selected in an ordered and looping fashion as they are assigned to clip identifiers.

To illustrate this, consider an NPS having three players, and therefore three player identifier, namely $P_1$, $P_2$, and $P_3$, and further consider that each of seven ordered clip identifiers, namely $C_1$, $C_2$, $C_3$, $C_4$, $C_5$, $C_6$, and $C_7$ needs to be assigned a corresponding player identifier. By selecting player identifiers in an ordered and looping fashion as they are assigned to clip identifiers, clip identifiers may be assigned player identifiers such that: $C_1$ is assigned $P_1$, $C_2$ is assigned $P_2$, $C_3$ is assigned $P_3$, $C_4$ is assigned $P_1$, $C_5$ is assigned $P_2$, $C_6$ is assigned $P_3$, and $C_7$ is assigned $P_1$.

Notably though, even after the player identifiers have been assigned to the clip identifiers, the rundown may again be edited. In some instances, the rundown may even be edited while the news program is being produced. And this can present certain timing-related issues.

For instance, consider that a news program is being produced in accordance with the seven assignments provided above. Further consider that while the player identified by the player identifier $P_3$ is playing out the clip identified by the clip identifier $C_3$, the rundown is modified by moving the clip identified $C_6$ up two spots in the order such that the order of clip identifiers is changed to $C_1$, $C_2$, $C_3$, $C_6$, $C_4$, $C_5$, and $C_7$.

With this change, the same player identifier $P_3$ is assigned to two consecutive clip identifiers, namely $C_3$ and $C_6$. As noted above, a player may be configured such that it may either load or playout a clip (but not both together) at any given time. As such, as a result of the rundown being edited in this manner, once the player identified by the player identifier $P_3$ plays out the clip identified by the clip identifier $C_3$, the player needs some time to load the clip identified by the clip identifier $C_6$ before it can playout that clip. This delay may be undesirable.

Examples of the disclosed system and method may help address the delay and player assignment issues discussed above by improving the manner in which players are assigned to clips.

As disclosed herein, an example method may involve accessing a first list that includes ordered clip identifiers accessing a second list that includes a player identifiers $P_q$, and accessing a third list that includes player identifiers $P_1 \ldots P_x$. For instance, this may involve accessing a rundown that includes ordered clip identifiers $C_1 \ldots C_7$, accessing a list that includes a player identifier $P_4$, and accessing a list that includes player identifiers $P_1 \ldots P_3$.

Further, the method may involve making a determination that a particular clip identifier from the clip identifiers $C_1 \ldots C_n$ is associated with a particular property, and responsive to making the determination, assigning to the particular clip identifier, the player identifier $P_q$. For instance, this may involve making a determination that the clip identifier $C_6$ is associated with a particular property, and responsive to making the determination, assigning to the particular clip identifier $C_6$, the player identifier $P_4$.

Further, the method may involve assigning to each clip identifier $C_1 \ldots C_n$ except for the particular clip identifier, a respective one of the player identifiers $P_1 \ldots P_x$, wherein the respective ones of the player identifiers are selected in an ordered and looping fashion. For instance, this may involve assigning to each clip identifier $C_1 \ldots C_5$ and $C_7$ a respective one of the player identifiers $P_1 \ldots P_3$, wherein the respective ones of the player identifiers $P_1 \ldots P_3$ are selected in an ordered and looping fashion such that: $C_1$ is assigned $P_1$, $C_2$ is assigned $P_2$, $C_3$ is assigned $P_3$, $C_4$ is assigned $P_1$, $C_5$ is assigned $P_2$, and $C_7$ is assigned $P_3$.

Now consider that the rundown is modified as in the example provided above such that the order of clip identifiers is changed to $C_1$, $C_2$, $C_3$, $C_6$, $C_4$, $C_5$, and $C_7$. However, unlike the example provided above where the traditional scheduling approach was employed, the modified rundown does not result in a single player identifier being assigned to the two consecutive clip identifiers $C_3$, $C_6$. As a result, the clips identified by the clips identifiers $C_3$ and $C_6$ may be played out without any intervening delay. For at least this reason, the disclosed system and method improves upon the traditional approach described above.

Also, in some examples, the method may involve responsive to making the determination that the particular clip identifier is associated with the particular property, causing the clip identified by the particular clip identifier to be loaded into the player identified by the particular player identifier. In some instances, the method may involve responsive to making the determination, causing the clip identified by the particular clip identifier to be loaded into the player identified by the particular player identifier proximate a time that the determination is made. This may allow the clip identified by the particular clip identifier to be played upon request and without a loading delay.

While in one example, the disclosed method may be implemented in connection with a NPS and a news program, the disclosed method may also be implemented in connection with other types of systems and with other types of programs or other video. For instance, in one example, the disclosed method may be implemented in connection with a master control system.

II. Example NPS

FIG. 1 is a simplified block diagram of an example NPS 100. The NPS 100 may be configured to perform a variety of functions related to producing a news program. The NPS 100 may output the news program in video form, which in turn may be sent to a broadcasting system for broadcast (e.g., via an over-the-air television broadcast or an Internet feed). It is understood that the video output from the NPS 100 may be subjected to additional processing before being broadcast. For example, the video may be modified with a DVE before being broadcast.

The NPS 100 may include one or more devices, including for example a scheduling system 102, a player controller 104, a data storage 106, one or more players 108a-d, a router 112, and a production switcher 114. Note that the NPS 100 need not include all of these devices and it may include additional devices.

Generally, the scheduling system 102 is configured to perform functions related to scheduling and managing the production of a news program, and the player controller 104 is configured to perform functions related to controlling the players 108a-d and the router 112.

Generally, each player 108a-d is configured to perform functions related to loading and/or playing out a clip. Each player 108a-d may take a variety of forms. For instance, each player 108a-d may take the form of a video player device or a software-based video player executing on a computing device. An example of a player is the K2 server provided by Grass Valley™ of San Francisco, Calif.

Generally the router 112 is configured to perform functions related to input-to-output mappings, and the production switcher 114 is configured to perform functions related to input-to-output mapping and running DVEs.

These devices may communicate with each other and/or with external devices via one or more communication paths. For example, the scheduling system 102 and the player controller 104 may communicate via path 116, the player controller 104 and the players 108a-d may communicate via respective paths 118a-d, and the players 108a-d and the data storage 106 may communicate via respective paths 120a-d. Further, the players 108a-d and the router 112 may communicate via respective paths 122a-d, and the router 112 and the production switcher 114 may communicate via respective paths 126a-d. Still further, the scheduling system 102 and the router 112 may communicate via path 128, the scheduling system 102 and the production system 114 may communicate via path 130, and the production switcher 114 may communicate with a device outside of the NPS 100, such as a television broadcasting system, via a path 132.

These devices may communicate with each other and/or with external devices according to one or more protocols. For example, the devices may communicate in accordance with one or more versions of the Media Object Server (MOS) protocol.

Figure 2:
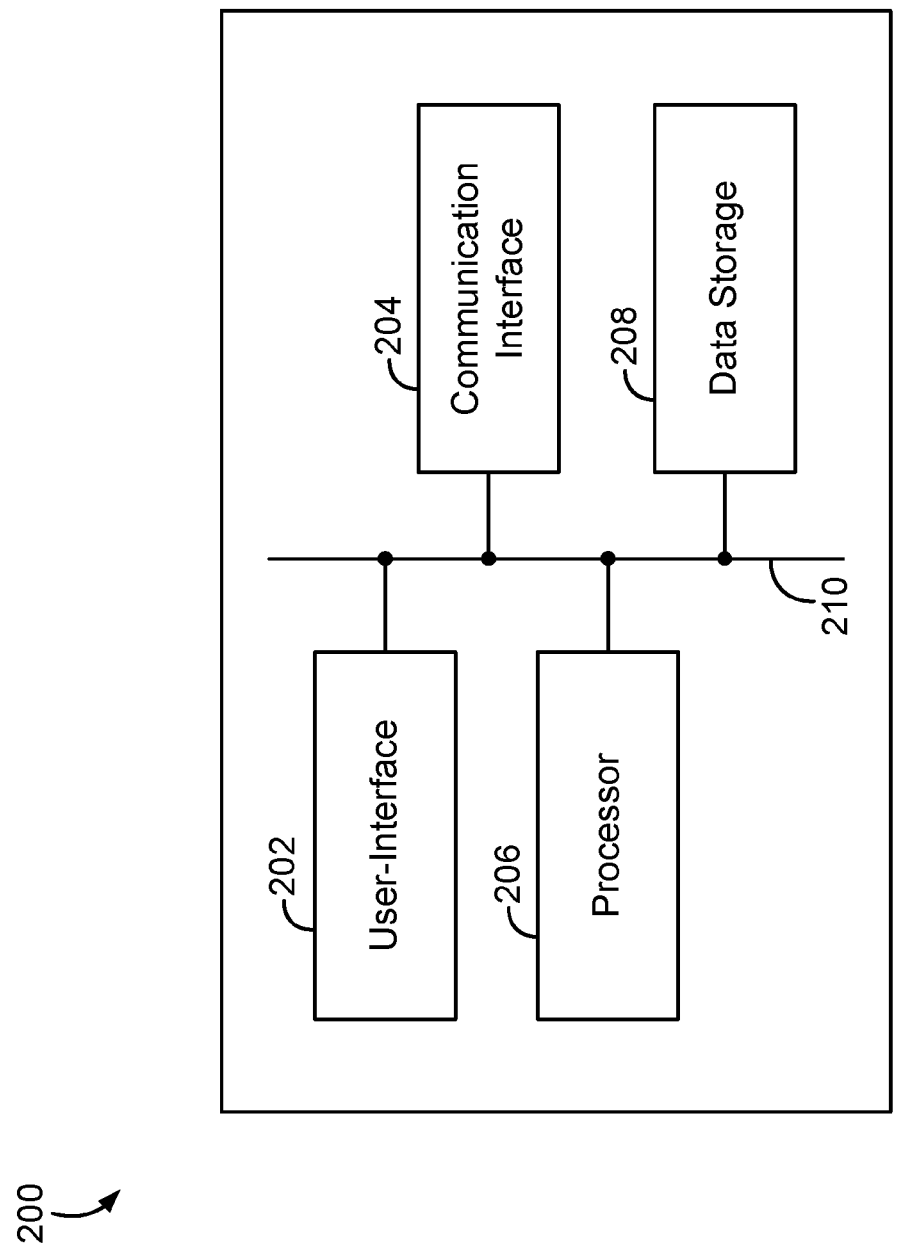
FIG. 2 is a simplified diagram of an example device.

FIG. 2 is a simplified block diagram of a device 200. The device 200 may take a variety of forms, including for example the scheduling system 102, the player controller 104, the data storage 106, one of the players 108a-d, the router 112, or the production switcher 114.

The device 200 may include various components, including for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker.

The communication interface 204 may function to allow the device 200 to communicate with other devices. In one example, the communication interface 204 may take the form of a wired interface, such as an Ethernet port, USB port, or High-Definition Multimedia Interface (HDMI) port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example Rundown

FIG. 3A shows portions of an example rundown 300 for a news program. The rundown 300 includes ordered rundown entries, each represented as a separate row. Each rundown entry includes one or more attributes, such as a title, a clip identifier, a player identifier, and/or a reserved player request as shown in the respective columns. For example, the first rundown entry has a title "Clip 1" and a clip identifier "$C_1$." As another example, the fourth rundown entry has a title "Clip 4." As yet another example, the sixth rundown entry has a title "Clip 6," a clip identifier "$C_6$," and a reserved player request (in the form of an "X" in the appropriate field) indicating that a reserved player is requested to be assigned to Clip 6 as described in greater detail below). Note that these attributes may be represented in a variety of different manners.

In one example, a user may create the rundown 300 via a user interface of a scheduling system and store the rundown in a data storage of the scheduling system. As such, by utilizing the rundown 300, the user may indicate an order of clips to be played out for use in the news program.

Figures 3C, 3D:
FIG. 3C is a diagram of the example rundown of FIG. 3A, in a third state.
FIG. 3D is a diagram of the example rundown of FIG. 3A, in a fourth state.

Notably, each of FIGS. 3A-3D shows the rundown 300 in a different state. For instance, FIG. 3A shows the rundown in a first state where player identifiers have not yet been added to the rundown. The additional states of the rundown as shown in FIGS. 3B-3D are described below in conjunction with examples of the disclosed method.

It should also be noted that the rundown 300 has been greatly simplified for the purposes of providing examples of the disclosed system and method. In practice, a rundown is likely, although not required, to include significantly more data. For example, a rundown may include additional rundown entries that correspond to events other than playing out clips. Such rundown entries may be arranged before, after, or in between the example rundown entries described above. Further, in some instances, a given rundown entry may correspond to multiple events. As such, in one example, a rundown entry may include multiple clip identifiers (and corresponding assigned player identifiers).

In addition, a rundown may include commercial break markers that divide the rundown into multiple blocks. As another example, rundown entries may include additional attributes, including for example, an index or "page" number, an estimated duration, an actual duration, and/or an author. Further, each rundown entry may include a script that, when executed, causes certain NPS-related functions to be performed. Also, in some instances, a rundown entry may include multiple clip identifiers, respective player identifiers, and/or respective reserved player requests. However, as noted above, for the sake of simplicity, the simplified rundown 300 is provided herein.

III. Example Operations

An example of the disclosed method will now be described principally in connection with a NPS and a news program. However, as noted above, the disclosed method can extend to apply with respect to other types of systems and other types of programs or other video. For instance, the disclosed method may be applied with respect to a master control system.

Figure 4:
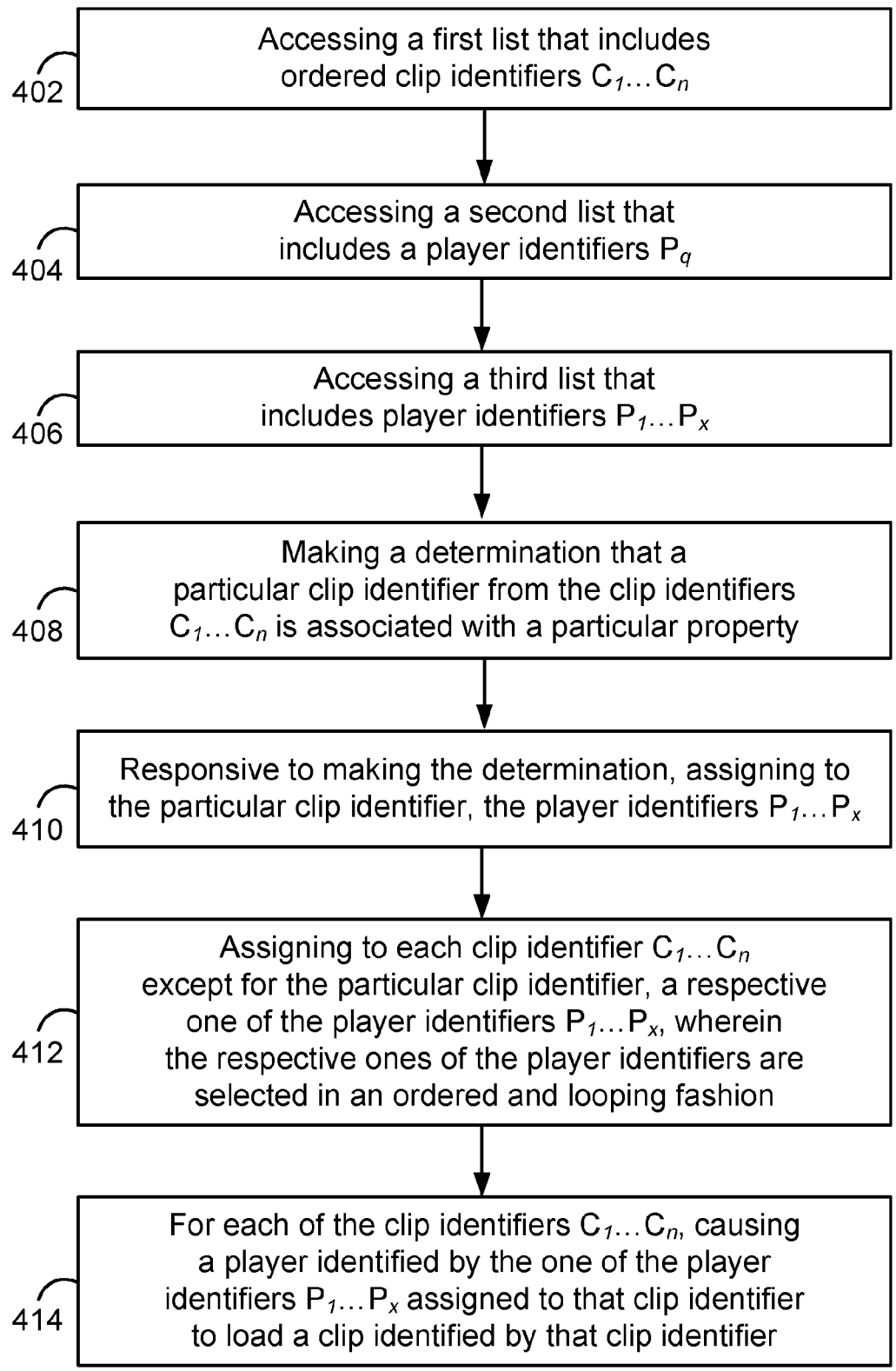
FIG. 4 is a flowchart showing functions of an example of the disclosed method.

FIG. 4 is a flowchart showing functions of an example of the disclosed method. At block 402, the method may involve accessing (e.g., from a local or remote data storage) a first list that includes ordered clip identifiers $C_1 \ldots C_n$. For example, as shown in FIG. 3A, this may involve the scheduling system 102 accessing the rundown 300 that includes ordered clip identifiers $C_1 \ldots C_7$. In one example, the scheduling system 102 may access the rundown 300 from a data storage.

At block 404, the method may involve accessing (e.g., from a local or remote data storage) a second list that includes a player identifier $P_q$. For example, this may involve the scheduling system 102 accessing a list that includes the player identifier $P_4$ that identifies the player 108d.

At block 406, the method may involve accessing a third list that includes player identifiers $P_1 \ldots P_x$. For example, this may involve the scheduling system 102 accessing a list of player identifiers $P_1 \ldots P_3$, where each identifier identifies one of the players 108a-c. For instance, the player identifiers $P_1$, $P_2$, and $P_3$ may identify players 108a, 108b, and 108c, respectively. In one example, the scheduling system 102 may access the list of the player identifier $P_4$ and/or the list of player identifiers $P_1 \ldots P_3$ from a data storage.

At block 408, the method may involve making a determination that a particular clip identifier from the clip identifiers $C_1 \ldots C_n$ is associated with a particular property. For instance, this may involve the scheduling system 102 making a determination that the clip identifier $C_6$ is associated with a particular property (i.e., characteristic), namely that the associated rundown entry includes a reserved player request. Such a request may be provided (e.g., in the form of an "X" in an appropriate field of the rundown entry) by a user when creating the rundown so as to indicate that a player should be reserved for the purposes of being assigned to the associated clip. In some instances, the user may indicate this request when the user determines that there is a strong likelihood that that clip will be requested to be played out with little or no notice. Note that in some instances, the user may indicate this request before the clip is even available (in which case the clip identifier may effectively serve as a placeholder). Note that other properties and/or other manners of indicating a reserved player request may also be considered or used in connection with the function at block 408.

At block 410, the method may involve responsive to making the determination, assigning to the particular clip identifier, the player identifier $P_q$. For instance, as shown in FIG. 3B, this may involve responsive to making the determination that the rundown entry associated with the clip identifier $C_6$ includes a reserved player request, assigning the player identifier $P_4$ to the clip identifier $C_6$. Note that the player identifier $P_4$ is used merely as an example. In another example, the second list may include additional player identifiers and such player identifiers may be used in this context as desired.

At block 412, the method may involve assigning to each clip identifier $C_1 \ldots C_n$ except for the particular clip identifier, a respective one of the player identifiers $P_1 \ldots P_x$, wherein the respective ones of the player identifiers are selected in an ordered and looping fashion. For instance, as shown in FIG. 3C, this may involve assigning to each clip identifier $C_1 \ldots C_5$ and $C_5$ a respective one of the player identifiers $P_1 \ldots P_3$, wherein the respective ones of the player identifiers are selected in an ordered and looping fashion. More particularly, this may involve assigning player identifiers to clip identifiers such that: $C_1$ is assigned $P_1$, $C_2$ is assigned $P_2$, $C_3$ is assigned $P_3$, $C_4$ is assigned $P_1$, $C_5$ is assigned $P_2$, and $C_7$ is assigned $P_3$.

Note that the act of assigning player identifiers selected in an ordered and looping fashion can take a variety of forms. For instance, the player identifiers may be selected in either a standard or reversed "ordered and looping" fashion. Further, when selecting player identifiers in this manner, the looping may "reset" for various reasons, such as after each commercial break in the rundown is encountered. Details concerning some example manners in which player identifiers may be selected in an ordered and looping fashion are described in U.S. Pat. Appl. No. 14/208,898 entitled "SYSTEM AND METHOD FOR SCHEDULING CLIPS" and U.S. Pat. Appl. No. 14/208,933 entitled "SYSTEM AND METHOD FOR SCHEDULING CLIPS," both of which are being filed by Applicant simultaneously with the filing of this disclosure. Also, in some embodiments, the respective ones of the player identifiers are selected in another fashion (i.e., not in an ordered and looping fashion).

In some instances, one or more of the functions described above may be repeated. For example, where multiple clip identifiers are associated with a particular property, the method may involve making a determination that multiple particular clip identifiers are associated with the particular property, and in response, performing the function at block 408 for each of the multiple particular clip identifiers. This may allow each of multiple clips to be loaded and playout out of a respective player reserved for that purpose.

At block 414, the method may involve for each of the clip identifiers $C_1 \ldots C_n$, causing a player identified by the one of the player identifiers $P_x$ or $P_1 \ldots P_x$ assigned to that clip identifier to load a clip identified by that clip identifier. For instance, this may involve for each of the clip identifiers $C_1 \ldots C_7$, the scheduling system 102 causing a player identified by the one of the player identifiers $P_4$ or $P_1 \ldots P_3$ assigned to that clip identifier to load a clip identified by that clip identifier.

In one example, the function at block 414 may involve for each of the clip identifiers $C_1 \ldots C_n$, the scheduling system 102 sending that clip identifier and the respectively assigned player identifier to the player controller 104. In turn, the player controller 104 may (i) map the player identifiers to the players 108a-d, (ii) map the clip identifiers to clips, and (iii) cause the players 108a-d to load the respective, mapped clips. The player controller 104 may cause the players 108a-d to load the respective mapped clips by sending suitable instructions to the players 108a-d, for instance.

In one example, one or more of the players 108a-d may load a clip contemporaneously while another one of the players 108a-d plays out a loaded clip. In this context, the player controller 104 may monitor the status of one of the players 108a-d to determine when the monitored player finishes playing out its previously loaded clip. In response to making this determination, the player controller 104 may then cause the monitored player 108a-d to load its next clip. This way, the players 108a-d collectively may be able to playout each clip indicated in the rundown in order and without any undesired delay.

In some examples, the method may involve responsive to making the determination that the particular clip identifier is associated with the particular property, causing the clip identified by the particular clip identifier to be loaded into the player identified by the particular player identifier. In some instances, the method may involve responsive to making the determination, causing the clip identified by the particular clip identifier to be loaded into the player identified by the particular player identifier proximate a time that the determination is made. This may allow the clip identified by the particular clip identifier to be played upon request and without a loading delay. Continuing with the example provided above, this may involve responsive to the scheduling system 102 making the determination, the scheduling system 102 causing the clip identified by the clip identifier $C_6$ to be loaded into the player 108d proximate a time that the scheduling system 102 makes the determination.

Each of the players 108a-d may be configured to play out a clip in response receiving a request. Likewise, the router 112 and/or the production switcher 114 may be configured to set a given input-to-output mapping (e.g., to map one of its physical inputs to one of its physical output) in response to receiving a request. As such, in response to one of the players 108a-d, the router 112, and the production switcher 114 receiving suitable requests, the player 108a-d may playout a clip that gets channeled through the router 112 and the production switcher 114, and made part of the news program output on path 132.

The clip may be made part of the news program in a variety of way. For instance, the production switcher 114 may run a DVE (e.g., as indicated in a rundown) that combines video from one or more physical inputs to produce the news program. For example, the output video may include live video of a news anchor discussing a news story while a clip related to that news story plays in a box over the news anchor's shoulder.

In one example, a user may provide the requests described above directly to one of the players 108a-d and/or to the router 112 and the production switcher 114. Alternatively, the scheduling system 102 may be configured to send such requests. This type of scheduling system 102 may be configured to traverse a rundown one rundown entry at a time (e.g., in response to a user pressing a spacebar key on a keyboard). Then, when the scheduling system 102 traverses a rundown entry that corresponds to a clip, the scheduling system 102 may automatically send (i) a request to the one of the players 108a-d assigned to the clip to play out the clip, (ii) and a request to the router 112 and/or the production switcher 110 to set the appropriate input-to-output mapping such that the clip may be used as part of the news program. In one example, the scheduling system 102 and/or another device (e.g., the player controller 104) may cause the one of the players 108a-d, the router 112, and the production switcher 114 to perform these functions at or about the same time.

Notably, in some examples, the scheduling system 102 may send requests to one of the players 108a-d, the router 112, and/or the production switcher 114 via other entities. For instance, the scheduling system 102 may send a request to the player controller 104, which in turn may send the request to the one of the players 108a-d.

In one example, the scheduling system 102 may perform (or repeat) select functions, such as the function at block 412 in response to the scheduling system 102 making a determination that the rundown has been initialized or edited. A rundown may be initialized (sometimes referred to as "MOS activated") at a predetermined time and/or in response to a request from a user, but in either case before the corresponding news program is produced. This initialization process therefore allows the scheduling system 102 to assign players to clips in the manner described above before the news program is produced.

A rundown may also be edited at any time, including perhaps while the news program is being produced. For example, consider the rundown 300 as shown in FIG. 3C. In one example, a user may edit the rundown 300 to move the sixth rundown entry (i.e., corresponding to Clip 6) up two spots, thereby modifying the rundown 300 into a new state as shown in FIG. 3D. However, unlike the example provided above where the traditional scheduling approach was employed, the modified rundown does not result in a single player identifier being assigned to the two consecutive clip identifiers $C_3$, $C_6$. As a result, Clips 3 and 6 may be played out without any intervening delay. For at least this reason, the disclosed system and method improves upon the traditional approach described above.

Figure 5:
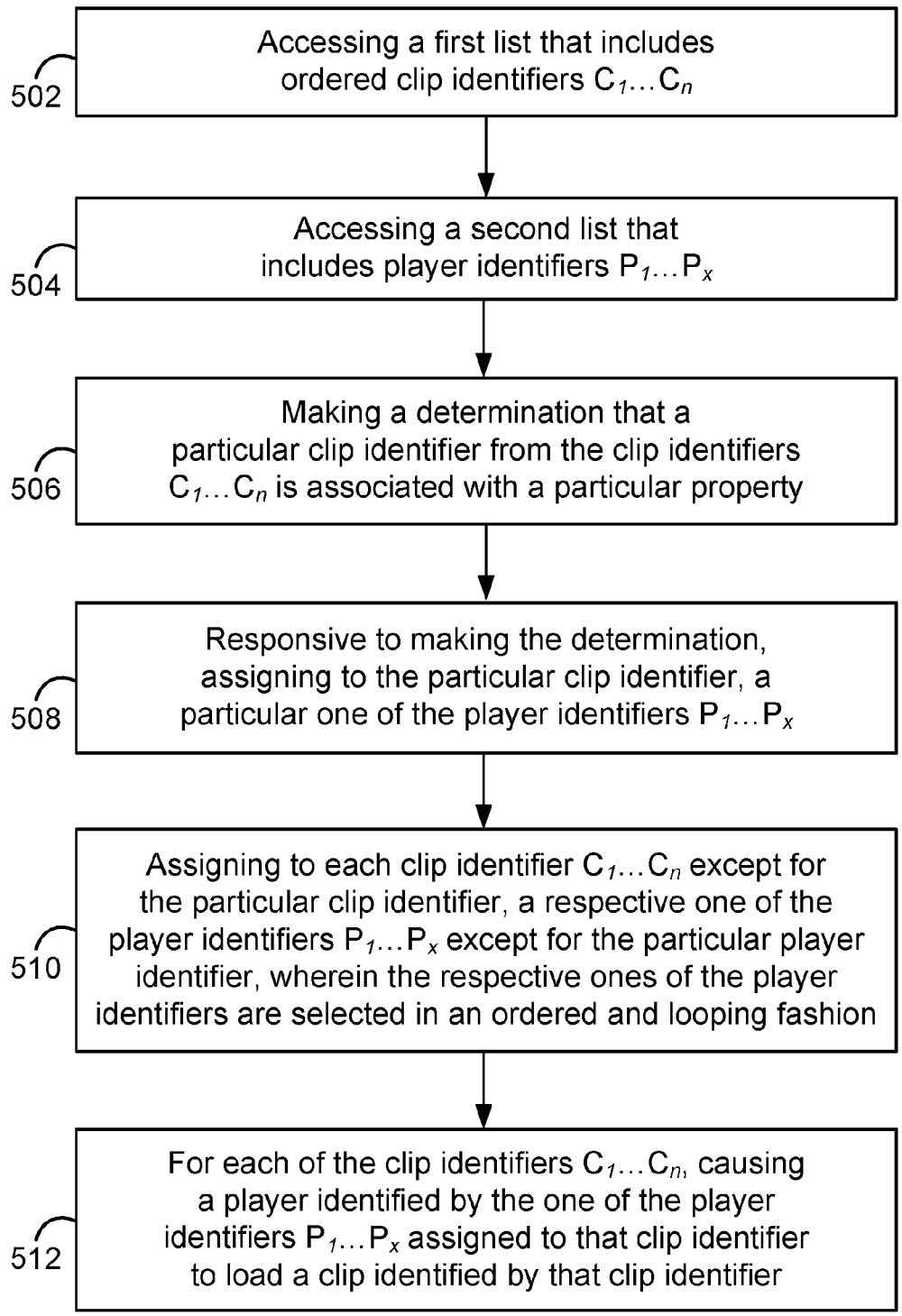
FIG. 5 is a flowchart showing functions of another example of the disclosed method.

FIG. 5 is a flowchart showing functions of another example of the disclosed method. At block 502, the method may involve accessing a first list that includes ordered clip identifiers $C_1 \ldots C_n$. For example, as shown in FIG. 3A, this may involve the scheduling system 102 accessing the rundown 300 that includes ordered clip identifiers $C_1 \ldots C_7$. In one example, the scheduling system 102 may access the rundown 300 from a data storage.

At block 504, the method may involve accessing a second list that includes player identifiers $P_1 \ldots P_x$. For example, this may involve the scheduling system 102 accessing a list of player identifiers $P_1 \ldots P_4$, where each identifier identifies one of the players 108a-d. For instance, the player identifiers $P_1$, $P_2$, $P_3$, and $P_4$, may identify player 108a, 108b, 108c, and 108d, respectively. In one example, the scheduling system 102 may access the list of player identifiers $P_1 \ldots P_4$ from a data storage.

At block 506, the method may involve making a determination that a particular clip identifier from the clip identifiers $C_1 \ldots C_n$ is associated with a particular property. For instance, this may involve the scheduling system 102 making a determination that the clip identifier $C_6$ is associated with a particular property (i.e., characteristic), namely that the associated rundown entry includes a reserved player request. Such a request may be provided (e.g., in the form of an "X" in an appropriate field of the rundown entry) by a user when creating the rundown so as to indicate that a player should be reserved for the purposes of being assigned to the associated clip. In some instances, the user may indicate this request when the user determines that there is a strong likelihood that that clip will be requested to be played out with little or no notice. Note that in some instances, the user may indicate this request before the clip is even available (in which case the clip identifier may effectively serve as a placeholder). Note that other properties and/or other manners of indicating a reserved player request may also be considered or used in connection with the function at block 506.

At block 508, the method may involve responsive to making the determination, assigning to the particular clip identifier, a particular one of the player identifiers $P_1 \ldots P_x$. For instance, as shown in FIG. 3B, this may involve responsive to making the determination that the rundown entry associated with the clip identifier $C_6$ includes a reserved player request, assigning the player identifier $P_4$ to the clip identifier $C_6$. Note that the player identifier $P_4$ is used merely as an example. In another example, a different player identifier from the player identifiers $P_1 \ldots P_4$ may be used as desired.

At block 510, the method may involve assigning to each clip identifier $C_1 \ldots C_n$ except for the particular clip identifier, a respective one of the player identifiers $P_1 \ldots P_x$ except for the particular player identifier, wherein the respective ones of the player identifiers are selected in an ordered and looping fashion. For instance, as shown in FIG. 3C, this may involve assigning to each clip identifier $C_1 \ldots C_5$ and $C_5$ a respective one of the player identifiers $P_1 \ldots P_3$, wherein the respective ones of the player identifiers are selected in an ordered and looping fashion. More particularly, this may involve assigning player identifiers to clip identifiers such that: $C_1$ is assigned $P_1$, $C_2$ is assigned $P_2$, $C_3$ is assigned $P_3$, $C_4$ is assigned $P_1$, $C_5$ is assigned $P_2$, and $C_7$ is assigned $P_3$.

At block 512, the method may involve for each of the clip identifiers $C_1 \ldots C_n$, causing a player identified by the one of the player identifiers $P_1 \ldots P_x$ assigned to that clip identifier to load a clip identified by that clip identifier. For instance, this may involve for each of the clip identifiers $C_1 \ldots C_7$, the scheduling system 102 causing a player identified by the one of the player identifiers $P_1 \ldots P_4$ assigned to that clip identifier to load a clip identified by that clip identifier.

VII. Example Variations

While one or more functions have been described as being performed by certain devices or entities (e.g., the scheduling system 102), the functions may be performed by any device or entity, such as those included in the NPS 100 described above.

For instance, rather than the scheduling system 102 assigning player identifiers to clip identifiers, the scheduling system 102 may send clip identifiers to the player controller 104 such that the player controller 104 may assign player identifiers to clip identifiers. Then, the player controller 104 may send to the scheduling system 102, an indication of such assignments such that the scheduling system 102 may edit the rundown accordingly. In another example, the player controller 104 may perform some or all of the functions described above.

As noted above, while examples of the disclosed method have been described in connection with an NPS and a news program, examples of the method may be implemented in other environments and/or in connection with other programs or other types of video. For instance, in one example, the disclosed method may be implemented in connection with a master control system. A master control system may facilitate the broadcast of a program according to a traffic schedule (sometimes referred to as a "traffic log"), which specifies an order of events that relate to a broadcast for a given station during a given time period. According to one example variation, in connection with the method described above, rather than being part of a rundown, the first list may be part of a traffic schedule for a program broadcast. In this instance, a block of clip identifiers may correspond to a block of the program broadcast, and another block of clip identifiers may correspond to another block of the program broadcast. The blocks of clip identifiers may be separated from each other by a particular portion of the traffic schedule, such as a reference to a particular video source, for instance.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method. For instance, the variations discussed in connection with the example method shown in FIG. 4 are also applicable to the example method shown in FIG. 5.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A computing device comprising:
a processor; and
a non-transitory computer-readable medium having stored thereon program instructions that when executed by the processor cause the computing device to perform a set of functions comprising:
accessing a first list that includes ordered clip identifiers $C_1 \ldots C_n$, wherein n is an integer;
accessing a second list that includes a player identifier $P_q$, wherein q is an integer;
accessing a third list that includes player identifiers $P_1 \ldots P_x$, wherein x is an integer;
making a determination that a particular clip identifier from the clip identifiers $C_1 \ldots C_n$ is associated with a particular property;
responsive to making the determination, assigning to the particular clip identifier, the player identifier $P_q$;
assigning to each clip identifier $C_1 \ldots C_n$ except for the particular clip identifier, a respective one of the player identifiers $P_1 \ldots P_x$, wherein the respective ones of the player identifiers are selected in an ordered and looping fashion; and
for each of the clip identifiers $C_1 \ldots C_n$, causing a video player identified by the one of the player identifiers $P_q$ or $P_1 \ldots P_x$ assigned to that clip identifier to load a clip identified by that clip identifier.

2. The computing device of claim 1, wherein the first list is part of a traffic schedule for a program broadcast.

3. The computing device of claim 1, wherein the first list is part of a rundown for a news program.

4. The computing device of claim 3, wherein making the determination comprises using the rundown to determine that the particular clip identifier is associated with the particular property.

5. The computing device of claim 3, wherein making the determination comprises making a first determination, the functions further comprising:
making a second determination that the rundown has been initialized, wherein assigning to each clip identifier $C_1 \ldots C_n$ except for the particular clip identifier, a respective one of the player identifiers $P_1 \ldots P_x$ occurs in response to making the second determination.

6. The computing device of claim 3, wherein making the determination comprises making a first determination, the functions further comprising:
making a second determination that the rundown has been edited, wherein assigning to each clip identifier $C_1 \ldots C_n$ except for the particular clip identifier, a respective one of the player identifiers $P_1 \ldots P_x$, occurs in response to making the second determination.

7. The computing device of claim 1, the functions further comprising:
for each of the clip identifiers $C_1 \ldots C_n$, causing the player identified by the one of the player identifiers $P_q$ or $P_1 \ldots P_x$ assigned to the that clip identifier to play out the respective loaded clip.

8. The computing device of claim 1, wherein the player comprises one of a video player device and a software-based video player executing on a computing device.

9. The computing device of claim 1, the functions further comprising:
responsive to making the determination, causing the clip identified by the particular clip identifier to be loaded into the player identified by the particular player identifier proximate a time that the determination is made.

10. A computing device comprising:
a processor; and
a non-transitory computer-readable medium having stored thereon program instructions that when executed by the processor cause the computing device to perform a set of functions comprising:
accessing a first list that includes ordered clip identifiers $C_1 \ldots C_n$, wherein n is an integer;
accessing a second list that includes player identifiers $P_1 \ldots P_x$, wherein x is an integer;
making a determination that a particular clip identifier from the clip identifiers $C_1 \ldots C_n$ is associated with a particular property;
responsive to making the determination, assigning to the particular clip identifier, a particular one of the player identifiers $P_1 \ldots P_x$;
assigning to each clip identifier $C_1 \ldots C_n$ except for the particular clip identifier, a respective one of the player identifiers $P_1 \ldots P_x$ except for the particular player identifier, wherein the respective ones of the player identifiers are selected in an ordered and looping fashion; and
for each of the clip identifiers $C_1 \ldots C_n$, causing a video player identified by the one of the player identifiers $P_1 \ldots P_x$ assigned to that clip identifier to load a clip identified by that clip identifier.

11. The computing device of claim 10, wherein the first list is part of a rundown for a news program.

12. The computing device of claim 10, wherein the first list is part of a traffic schedule for a program broadcast.

13. A non-transitory computer-readable medium including a set of program instructions, that when executed, cause performance of a set of functions comprising:
accessing a first list that includes ordered clip identifiers $C_1 \ldots C_n$, wherein n is an integer;
accessing a second list that includes player identifiers $P_1 \ldots P_x$, wherein each player identifier $P_1 \ldots P_x$ corresponds with a respective one of the players, and wherein x is an integer;
making a determination that a particular clip identifier from the clip identifiers $C_1 \ldots C_n$ is associated with a particular property;
responsive to making the determination, assigning to the particular clip identifier, a particular one of the player identifiers $P_1 \ldots P_x$; and
assigning to each clip identifier $C_1 \ldots C_n$ except for the particular clip identifier, a respective one of the player identifiers $P_1 \ldots P_x$ except for the particular player identifier, wherein the respective ones of the player identifiers are selected in an ordered and looping fashion.

14. A non-transitory computer-readable medium including a set of program instructions, that when executed, cause performance of a set of functions comprising:
accessing a first list that includes ordered clip identifiers $C_1 \ldots C_n$, wherein n is an integer;
accessing a second list that includes player identifier $P_q$, wherein the player identifier $P_q$ corresponds with one of the players in a first set of players, and wherein q is an integer;
accessing a third list that includes player identifiers $P_1 \ldots P_x$, wherein each player identifier $P_1 \ldots P_x$ corresponds with a respective one of the players in a second set of players, and wherein x is an integer;
making a determination that a particular clip identifier from the clip identifiers $C_1 \ldots C_n$ is associated with a particular property;

responsive to making the determination, assigning to the particular clip identifier the player identifier $P_q$;

assigning to each clip identifier $C_1 \ldots C_n$ except for the particular clip identifier, a respective one of the player identifiers $P_1 \ldots P_x$, wherein the respective ones of the player identifiers are selected in an ordered and looping fashion; and for each of the clip identifiers $C_1 \ldots C_n$, causing the one of the players identified by the one of the player identifiers $P_q$ or $P_1 \ldots P_x$ assigned to that clip identifier to load a clip identified by that clip identifier.

15. The non-transitory computer-readable medium of claim 14, wherein the first list is part of a traffic schedule for a program broadcast.

16. The non-transitory computer-readable medium of claim 14, wherein the first list is part of a rundown for a news program.

17. The non-transitory computer-readable medium of claim 16, wherein making the determination comprises using the rundown to determine that the particular clip identifier is associated with the particular property.

18. The non-transitory computer-readable medium of claim 16, wherein making the determination comprises making a first determination, the set of functions further comprising:

making a second determination that the rundown has been initialized, wherein assigning to each clip identifier $C_1 \ldots C_n$ except for the particular clip identifier, a respective one of the player identifiers $P_1 \ldots P_x$ occurs in response to making the second determination.

19. The non-transitory computer-readable medium of claim 16, wherein making the determination comprises making a first determination, the set of functions further comprising:

making a second determination that the rundown has been edited, wherein assigning to each clip identifier $C_1 \ldots C_n$ except for the particular clip identifier, a respective one of the player identifiers $P_1 \ldots P_x$ occurs in response to making the second determination.

20. The non-transitory computer-readable medium of claim 16, the set of functions further comprising:

for each of the clip identifiers $C_1 \ldots C_n$, causing the player identified by the one of the player identifiers $P_q$ or $P_1 \ldots P_x$ assigned to the that clip identifier to play out the respective loaded clip.

\* \* \* \* \*